United States Patent

Taguchi et al.

[15] 3,701,929
[45] Oct. 31, 1972

[54] THREE-PHASE BUS SYSTEM AND INTERCONNECTING MEMBER

[72] Inventors: Kazuo Taguchi, Fuchu; Hiroaki Tsuchida, Yokohama, both of Japan

[73] Assignee: Tokyo Shibaura Electric Company Ltd., Kanagawa-ken, Japan

[22] Filed: May 11, 1971

[21] Appl. No.: 142,271

[30] Foreign Application Priority Data

May 13, 1970 Japan ...................... 45/40125

[52] U.S. Cl. ................... 317/103, 174/72 B, 174/86, 307/147
[51] Int. Cl. ........................... H02b 1/20, H02g 5/00
[58] Field of Search........ 174/70 B, 71 R, 71 B, 72 R, 174/72 B, 86, 88 B, 99 B, 99 E; 307/42, 147; 317/103

[56] References Cited

UNITED STATES PATENTS

| | | | |
|---|---|---|---|
| 1,962,326 | 6/1934 | Randall..................317/103 X |
| 2,069,575 | 2/1937 | Burge et al. ..............317/103 |

FOREIGN PATENTS OR APPLICATIONS

| | | |
|---|---|---|
| 245,093 | 2/1966 | Austria......................317/103 |
| 1,325,862 | 3/1963 | France......................317/103 |
| 1,362,997 | 4/1964 | France......................317/103 |
| 328,916 | 5/1930 | Great Britain.............317/103 |
| 382,000 | 10/1932 | Great Britain.............317/103 |
| 382,795 | 11/1932 | Great Britain ...........174/72 B |

*Primary Examiner*—Laramie E. Askin
*Attorney*—Oblon, Fisher & Spivak

[57] ABSTRACT

A three-phase bus system is disclosed which employs a connecting structure, which is adapted for connecting the lead-out bushings of a three-phase power transformer to three-phase bus conductors. The connecting structure includes a T-shaped member having two arms and a leg. The two arms of the T-shaped member are slidably supported in the bus conductors. A bent connecting conductor is provided for connecting a bushing terminal to the leg of the T-shaped member in a slidable and rotatable fashion whereby freedon of connection during assembly can be readily obtained.

3 Claims, 6 Drawing Figures

PATENTED OCT 31 1972 3,701,929

INVENTORS
KAZUO TAGUCHI
HIROAKI TSUCHIDA

BY *Oblon, Fisher & Spivak*
ATTORNEYS

3,701,929

THREE-PHASE BUS SYSTEM AND INTERCONNECTING MEMBER

BACKGROUND OF THE INVENTION

1. Field of the Invention

This invention relates in general to a three-phase bus system and more particularly to an interconnecting means for use in a three-phase system which is adapted for connecting various electrical installations to each other.

2. Description of the Prior Art

Recently the three-phase bus system, which includes three conductors running therethrough which are insulated by a gas having a high dielectric strength such as sulphur hexafluoride ($SF_6$), has been used in many electrical stations in order to reduce the size of the same. While somewhat satisfactory, difficulties remained in connecting an electrical installation such, for example, as a large scale electric power transformer to another electrical installation such, for example, as a switch gear. The reason for this is that generally a large scale power transformer has terminal bushings of a long length which extends upward from the top of the transformer. Accordingly, errors would often occur in positioning the several bushings upon the assembling thereof. As a result, the position of the terminal portions of the bushings would not be at the desired connecting position. In the past, in order to ensure a proper connection between bus conductors and the transformer bushing terminals, it was required that the bus duct and conductors provided therein each have portions of a relatively large flexibility along the lengthwise direction thereof. However, the provision of such a flexible bus duct was complicated to manufacture and expensive.

SUMMARY OF THE INVENTION

Accordingly, it is an object of this invention to provide a new and improved unique three-phase bus system which is capable of easy manufacture with a relatively low expense.

Another object of the present invention is to provide a new and improved unique three-phase bus system in which it is possible to minimize the number of flexible portions being located along the lengthwise direction of the duct.

A further object of the present invention is to provide a new and improved unique three-phase bus system in which it is not necessary to use flexible conductors of the type which could cause a dangerous short circuiting, grounding, breakdown of the conductor or the like to occur when an electromagnetic attractive or repulsive force results when a severe fault current flows through the conductors.

Still another object of the present invention is to provide a new and improved unique interconnecting member which enables terminal bushings to be readily connected to bus conductors.

Yet one other object of the present invention is to provide a new and improved unique interconnecting member for enabling the terminal bushings of a transformer to be easily and accurately connected to the conductors of a bus system used for connecting the transformer to other electrical devices.

Briefly, in accordance with this invention, these and other objects are in one aspect attained by mounting lead-out bushings, standing in parallel, on an upper portion of an electrical power transformer in a triangular arrangement. An enclosed casing filled with insulation gas therein is provided between the transformer and another electrical installation for passing bus conductors therethrough. An interconnecting member is slidably mounted on the respective bus conductors. Respective connecting conductors are also provided for enabling connection between the interconnecting member and the bushing terminals. Each of the connecting conductors has opposite ends which are located at off-centered positions and which are connected respectively to the interconnecting member and the bushing terminal.

BRIEF DESCRIPTION OF THE DRAWINGS

The present invention will be more fully understood from the following description when taken in connection with reference to the accompanying drawings wherein.

DETAILED DESCRIPTION OF THE PREFERRED EMBODIMENTS

Figure 1:
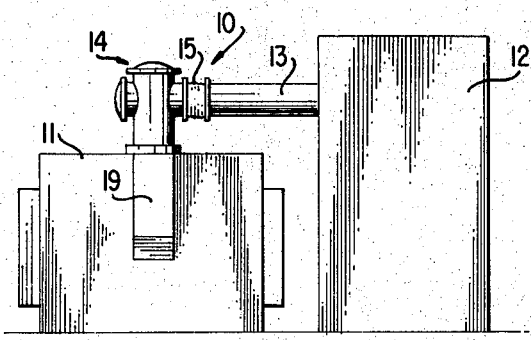
FIG. 1 is a front view showing electrical installations being connected by a three-phase bus system in accordance with the present invention.
Figure 2:
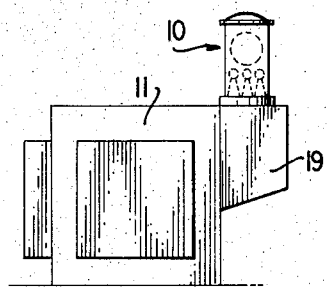
FIG. 2 is a side view of the electrical installations shown in FIG. 1.

Referring now to the drawings, wherein like reference numerals designate identical or corresponding parts throughout the several views, and more particularly to FIGS. 1 and 2 thereof, wherein a three-phase bus system is generally shown with a reference numeral 10 and the same is employed by way of example for connecting a large scale power transformer 11 to an enclosed type switch gear 12.

The three-phase bus system 10 includes a tubular duct 13 having one end attached to the switch gear 12 and extending horizontally therefrom, a housing 14 mounted on the upper portion of the transformer 11 to enclose three lead-out bushings provided on the transformer 12 as described hereinafter, and a flexible tubular member 15 positioned between the other end of tubular duct 13 and the housing 14 for absorbing any error that may have occurred along the lengthwise direction of the duct 13 upon installation.

Figure 3:
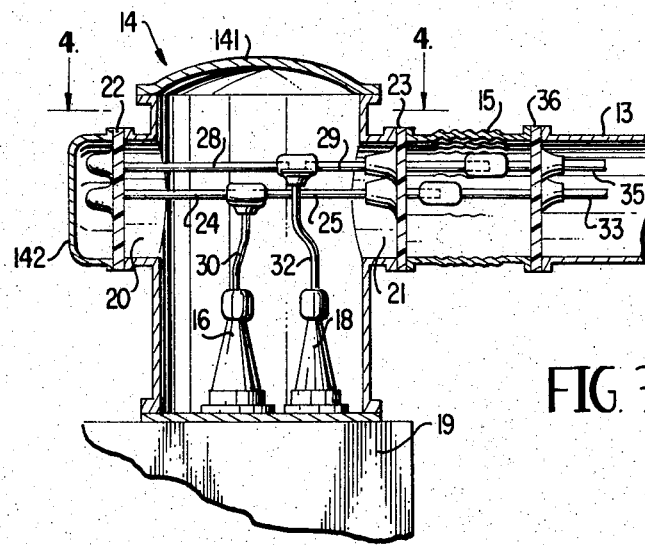
FIG. 3 is a sectional view, partly broken away, for showing a main portion of the present invention.
Figure 4:
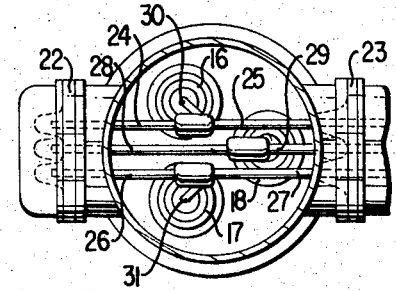
FIG. 4 shows a plan view, partly broken away, of a main portion of FIG. 3 in which a top cover of a housing for enclosing lead-out bushings is removed.

Referring now to FIGS. 3 and 4, three lead-out bushings 16, 17 and 18 are shown as standing on a bushing pocket 19 of the transformer 11, and the same are enclosed within the housing 14 and positioned at the respective apexes of a regular triangle. It has been found that such a triangular arrangement of the bushings 16, 17 and 18 will greatly minimize any positioning error over the heretofore arrangements wherein the three bushings were arranged in a row.

At the side wall of the housing 14 openings 20 and 21 positioned opposite to each other are provided. Insulating plates 22 and 23 are provided to close the openings 20 and 21 and to support a plurality of rod conductors 24, 25, 26, 27, 28 and 29 which extend horizontally above the bushings 16, 17 and 18. It should be understood that the conductors 24 and 25 are aligned with each other and that similarly the conductors 26 and 27, and 28 and 29 are aligned with each other.

As described hereinbelow, the interconnecting member is positioned between the respective faced ends of the aforesaid conductors to enable connection between the conductors and the bushing terminals through a connecting conductor 30, 31 and 32.

The rightward conductors 25, 27 and 29 extend through the insulating plate 23 into the flexible tubular duct 15, and then are connected to the switch gear 12 through conductors such as 33 and 35 positioned within the flexible duct 15 and the tubular duct 13. Conventional and slidable connector devices are provided between the faced ends of the conductors 29 and 35, and 25 and 33. To support the conductors 33 and 35 at a particular position, an insulating plate 36 is provided between the faced ends of the duct 13 and 15. While not shown in FIG. 3, it should be understood that conductor 27 is provided with a connecting conductor and slidable connector device in a similar fashion to that described above with regard to conductors 25 and 29. The housing 14 has a top cover 141 and a side cover 142. Additionally, the housing 14, the flexible tubular member 15, and the tubular duct 13 are filled with an insulation gas such, for example, as sulphur hexafluoride.

Figure 5:
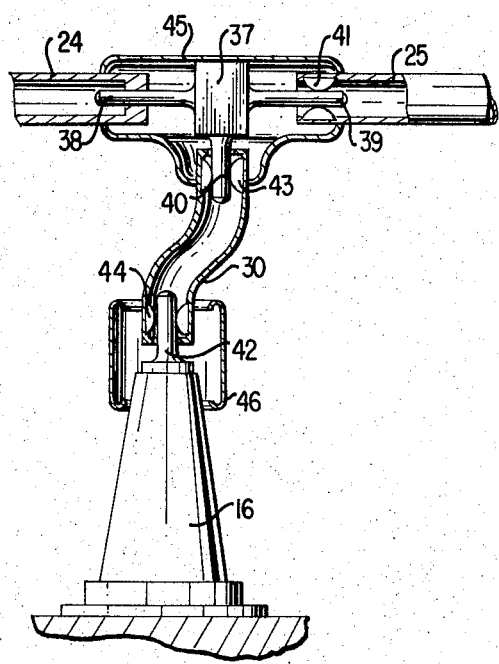
FIG. 5 is an enlarged view, partly in section, of a connecting structure for use in accordance with the present invention.
Figure 6:
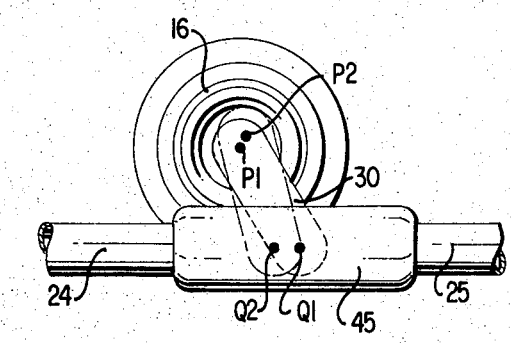
FIG. 6 is a plan view, partly broken away, of the connecting structure shown in FIG. 5.

With reference now to FIGS. 5 and 6, a connecting structure such as for connecting the lead-out bushing 16 to the conductor 25 will be described. It should be understood that similar connecting structures are provided for connecting the other bushings to a respective conductor and, accordingly, their disclosure is omitted herein.

The connecting structure is shown in FIG. 5 as a T-shaped interconnecting member 37 having a pair of arms 38 and 39, and a leg 40. The conductor 25 is preferably made hollow such that the arm 39 can be inserted into the left hand end of the conductor 25. At the inner periphery of the left hand end portion of the conductor 25 a plurality of contact segments 41, which are supported by resilient members (not shown) are provided such that a good electrical contact with slidable and rotatable engagement is made.

The arm 38 of the T-shaped member 37 is inserted into one end of the conductor 24 which is also preferably of the hollow type, and is supported by the same in a slidable and rotatable fashion. The hollow conductor 24 is supported at its other end by the insulating plate 22, and thus the member 37 can be held in a particular position. With this embodiment, it can be understood that the hollow conductor 24 serves as a supporting member for the T-shaped member 37, and the same may thus be made of an iron tube or the like without the need for contact segments. However, it should be apparent that the hollow conductor 24 may be made of a higher conductive material similar to that of the hollow conductor 25 is it is desired to provide an installation on the extension of the conductor 24.

The leg 40 is inserted into the upper end of the connecting conductor 30 and similarly the bushing terminal 42 is inserted into the lower end of the connecting conductor 30. The inside of both ends of the conductor 30 are provided with contact segments 43 and 44 similar to the segments 41 of the conductor 25. A static shield 45, which surrounds the T-shaped member 37 and is electrically connected thereto, is provided to restrain a corona discharging. Similarly, a static shield 46 is provided and surrounds the bushing terminal 42 and the lower end of the connecting conductor 30.

It can be seen from FIG. 5 that the conductor 30 is bent along the lengthwise axis thereof so as to have at least two bending portions. In this way, the axes of both ends of the conductor 30 are parallel to each other.

Referring now to FIG. 6, the bushing 16 is shown (with solid line) as being located at a regular position P1. Let us assume, however, that during installation the bushing is in fact located at a position P2 spaced apart from the position P1. In this case, the T-shaped member 37 can readily be moved leftward from Q1 to Q2 to thereby cause the axis of the lower end of the conductor 30 to coincide with the center axis of the bushing 16 which passes through the point P2.

It will now be apparent that in accordance with this invention, since bent connecting conductors are employed to connect the bushing terminals to the bus conductors located within the bus duct and thereby absorb the positioning errors of the bushings, that the connection between a transformer and other electrical installations can be easily made. Moreover, with the present invention, since the connecting conductors are of a rigid nature, no deformation of the connecting conductors will occur when a severe fault current flows through the connecting conductors. Furthermore, it should be understood that the regular triangular arrangement of the bushings of the present invention enables any positioning error to be reduced relative to the previous row arrangement of the bushings.

Obviously, numerous modifications and variations of the present invention are possible in light of the above teachings. Thus, for example, it should be apparent that solid conductors may be used instead of hollow conductors by utilizing contact fingers, such as tulip contacts, instead of the contact segments provided within the hollow conductors. It is therefore to be understood that within the scope of the appended claims the invention may be practiced otherwise than as specifically described herein.

What is claimed as new and desired to be secured by letters patent of the United States is:

1. A three-phase bus system connecting one electrical installation having three lead-out bushings with terminals to another electrical installation, comprising:
   three phase conductors located within a bus duct along the lengthwise direction thereof;
   interconnecting members for each of said three phase conductors respectively having at least one arm and a leg, said one arm being slidably connected to a respective end of said three phase conductors; and
   connecting rigid conductors, each having one end connected to said respective legs of said interconnecting members in a slidable and rotatable fashion and the other end connected to respective terminals of said lead-out bushings in a slidable and rotatable fahsion.

2. The invention according to claim 1, wherein: said three lead-out bushings are mounted on an electrical power transformer and are positioned approximately at the apexes of a regular triangle.

3. The invention according to claim 2, wherein: said three lead-out bushings are mounted within an enclosure filled with an insulating gas.

* * * * *